Oct. 1, 1957 M. A. CHAVANNES ET AL 2,808,098
METHOD AND APPARATUS FOR BONDING FIBERS TOGETHER
Filed Feb. 26, 1954 4 Sheets-Sheet 1
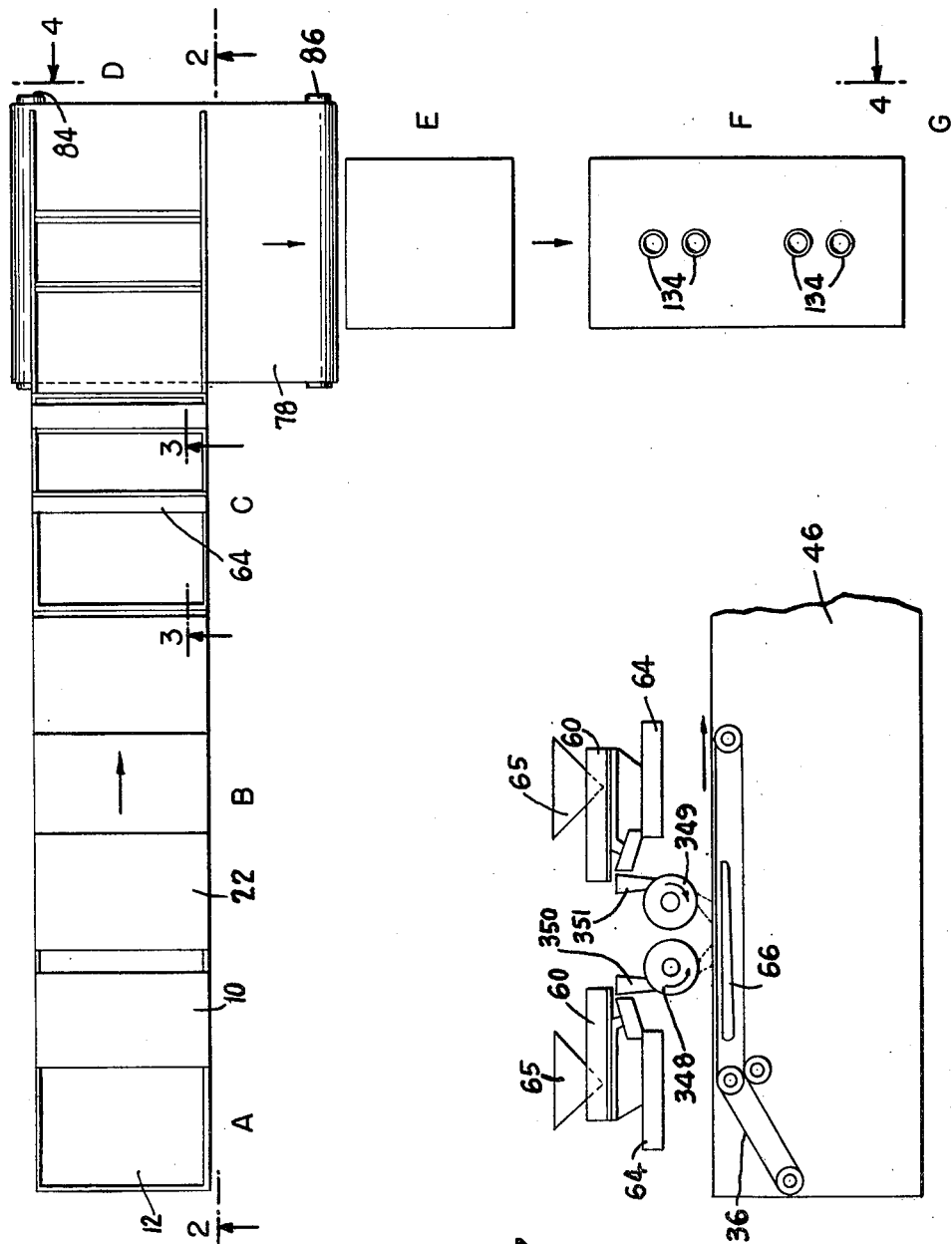

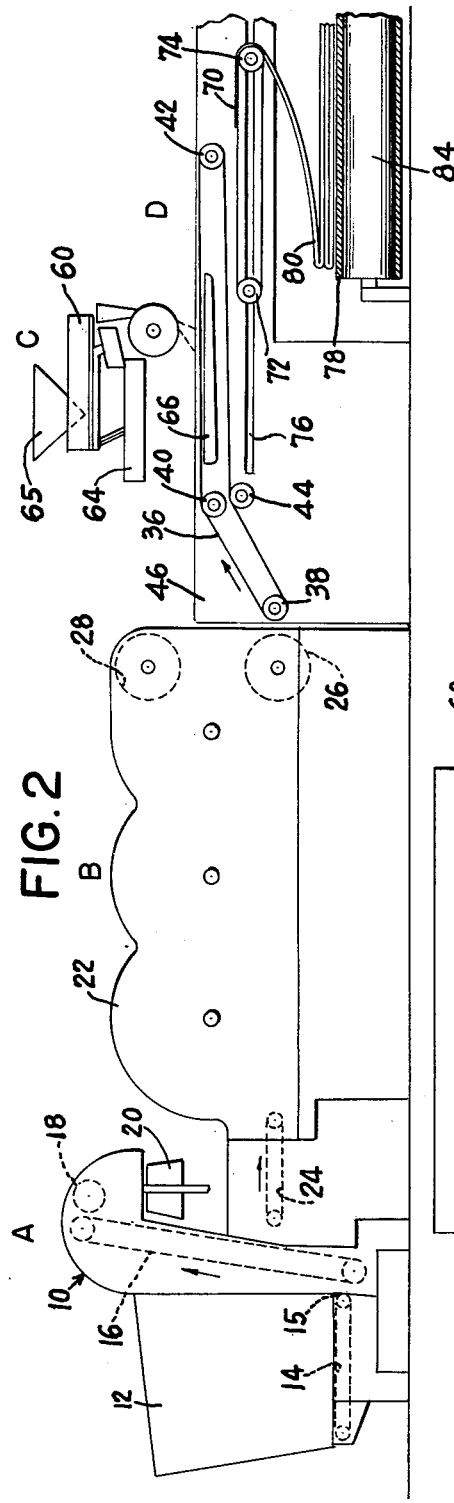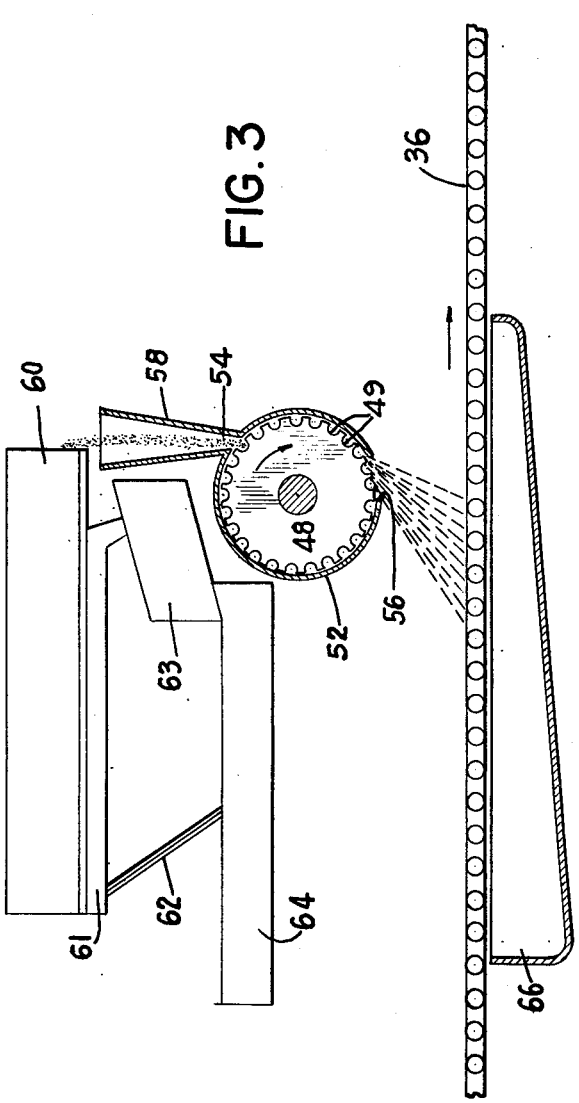

Oct. 1, 1957  M. A. CHAVANNES ET AL  2,808,098
METHOD AND APPARATUS FOR BONDING FIBERS TOGETHER
Filed Feb. 26, 1954                                     4 Sheets-Sheet 3
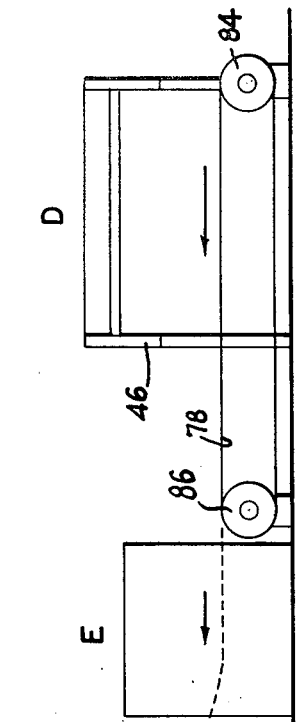
FIG.4
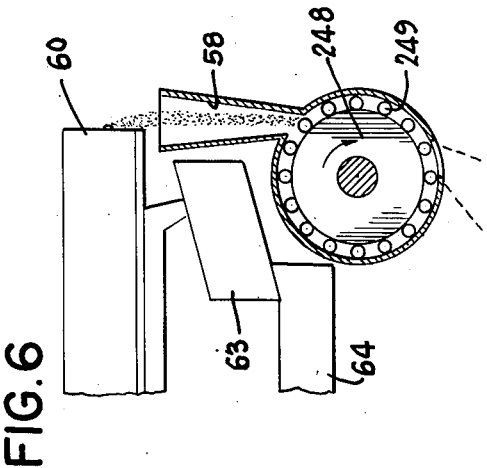
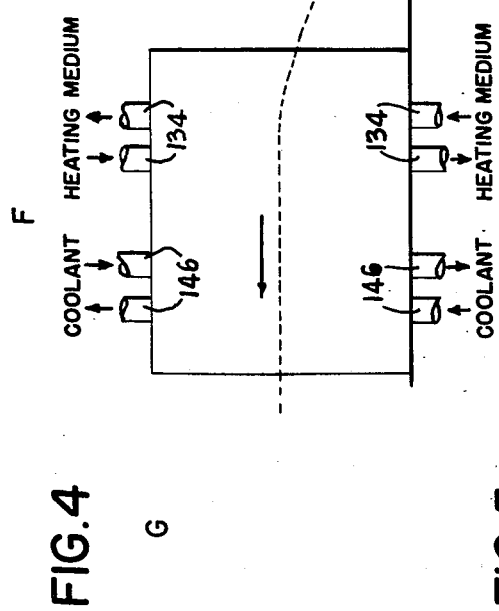
FIG.5
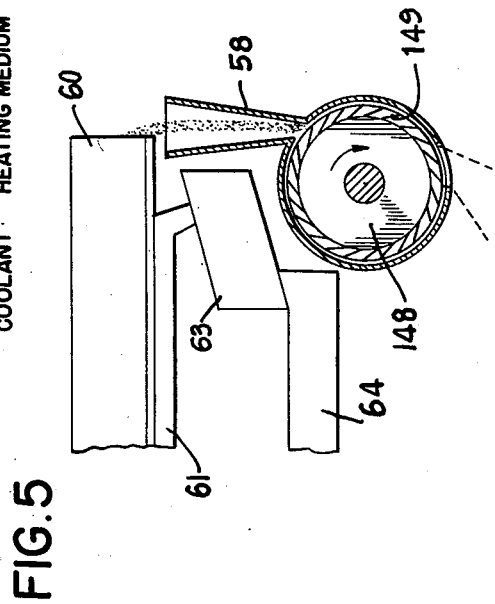
FIG.6

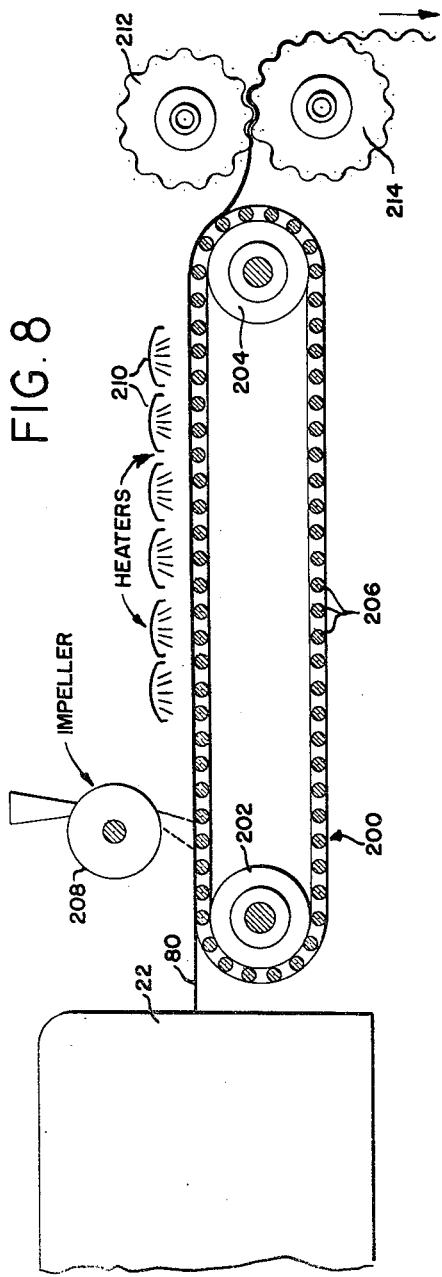
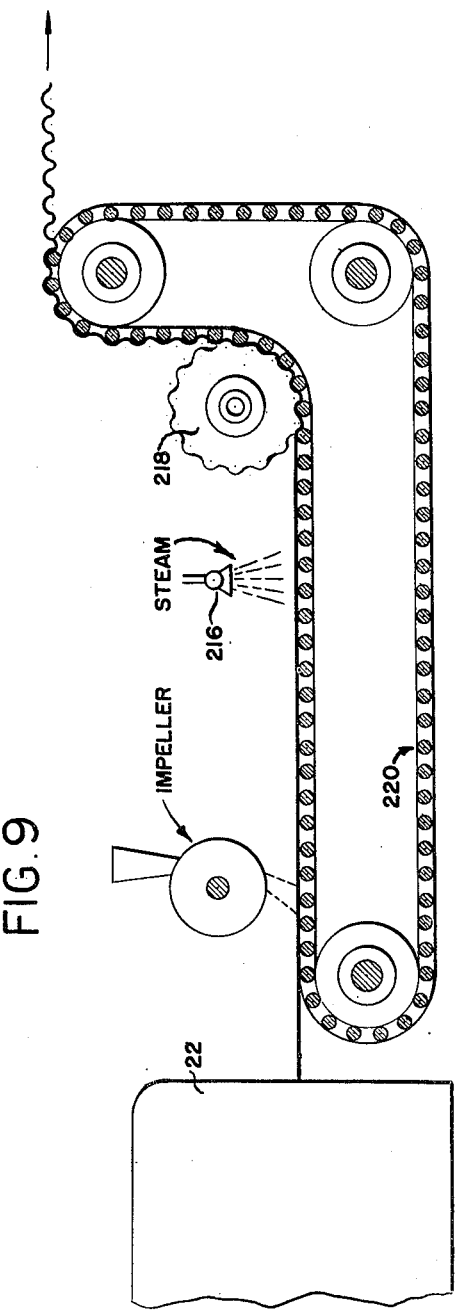

United States Patent Office 2,808,098
Patented Oct. 1, 1957

2,808,098

METHOD AND APPARATUS FOR BONDING FIBERS TOGETHER

Marc A. Chavannes, New York, N. Y., and James W. Howden, Ramsey, N. J., assignors, by mesne assignments, to Permex Corporation, New York, N. Y., a corporation of New York Application February 26, 1954, Serial No. 412,682

15 Claims. (Cl. 154—29)

This application relates to a method and apparatus for bonding fibers together with a powdered binder, and is a continuation-in-part of Chavannes and Howden application Serial No. 151.474, filed March 23, 1950, now Patent No. 2,671,496.

While the present invention is applicable to bonding together fibers of a wide variety of types, it is particularly useful for bonding together fibers of a type which cannot withstand high temperatures without damage, for example, vegetable and animal fibers, and is especially advantageous for cotton fibers.

One object of the invention is to produce fibrous sheet material, for example, batting material and felt material, comprising fibers bonded together with a powdered thermo-responsive resin as a binder. Such products may be used for a variety of purposes, for example, as upholstery material, packing material, and insulating material, and also for forming other articles. Particular objects of the invention are to produce such materials of high quality, to distribute the resin uniformly throughout the batting to the most effective points, and to minimize the quantity of resin used, consistent with good results.

Performance characteristics of such fibrous materials depend to a considerable extent upon the exact distribution of the resin within the layer of the fibers. The distribution of the resin, in turn, depends upon the manner in which it is introduced into the layer of fibers. An important feature of the present invention relates to the apparatus and method for introducing the resin into the layer. Since resin is a relatively expensive item of the components of the product, optimum distribution of the resin produces optimum quality and economy.

It has been found that a substantially improved product may be made in accordance with the present invention, which insures a degree of uniformity in the distribution of the resin in the layer of fibers not heretofore attained. Furthermore, substantial conservation of the resin material is also thereby effected, which makes possible a substantial reduction in cost in addition to the improvement of the product.

In one embodiment of the invention, the fibers are first arranged as a layer and advanced on a continuously moving conveyer. For applying the resin, there is provided a generally cylindrical rotor, or impeller, having a serrated outer surface defining resin-impelling surfaces. The outer surface may, for example, include teeth, grooves, or vanes which impel a stream of the resin mixed with air toward the fibers, in a manner to be described. The rotor preferably rotates on a horizontal axis. A shield closely embraces the rotor and has an inlet slot in its upper half, and a discharge slot in its lower half. The inlet slot is located in the 90° quadrant through which a given point of the rotor passes after passing the top. Connected to the inlet slot and extending upwardly therefrom is an inlet chute to prevent air currents from causing excessive disturbance in the resin flow. A resin feeding device, such as a vibratory feeder pan, supplies powdered thermo-responsive resin, for example, a vinyl resin, to the inlet chute, which in turn supplies it to the rotor. The rotor rotates continuously at high speed, and serves to discharge resin and air or other suitable gaseous medium from the discharge slot of the shield. A layer of fibers advances below the discharge slot, and the stream of resin and air from the rotor strikes the advancing layer of fibers and produces a uniform and very effective distribution of the resin within the layer of fibers. The resin within the layer is thereafter heated, so as to activate it and cause it to bond the fibers together, and is then cooled.

Certain special embodiments of the invention relate to corrugating the layer of fibers in combination with impelling powdered resin into it.

The above mentioned, and other features, together with the many advantages obtainable by the practice of the present invention, will be understood by persons skilled in the art by reference to the following detailed description taken in connection with the annexed drawings, which respectively describe and illustrate a preferred embodiment of the invention, and wherein, Figure 1 is a plan view of apparatus illustrating the application of the invention.

Figure 2 is a view chiefly in side elevation of a portion of the apparatus shown in Figure 1. The point of view of Figure 2 is shown at 2—2 in Figure 1.

Figure 3 is an enlarged view, chiefly in vertical section, of a portion of the apparatus shown in Figures 1 and 2. The sectional plane for Figure 3 is shown at 3—3 in Figure 1. The apparatus shown in Figure 3 includes the impeller for directing powdered resin into the layer of fibers.

Figure 4 is an elevational view, partially schematic, taken from the point of view of line 4—4 of Figure 1.

Figures 5 and 6 are views similar to Figure 3, but showing different embodiments of the impeller.

Figure 7 shows another arrangement of the apparatus utilizing two oppositely-rotating impellers.

Figure 8 is a side elevational view of apparatus for corrugating the layer of fibers.

Figure 9 is a side elevational view of another embodiment of apparatus for corrugating the layer of fibers.

Referring to Figure 1, it may be generally explained that in this illustrative embodiment fibers, fibrous material, or material from which fibers may be derived as by shredding, are introduced at station A, and are advanced progressively through the apparatus from left to right past station B, where they are arranged as a layer, past station C, where a powdered resin binder is introduced into the layer, to station D, where the fibers are arranged as a plurality of layers. From station D the composite mass advances in a direction transverse to its original path, past stations E and F, where additional processing is carried out, such as compacting and heating and cooling, and it emerges from the apparatus at station G as batting.

In Figures 1 and 2 there is shown a feeder, generally indicated at 10, including a bin 12. Fibers, which may be of any of a variety of types, are fed into this bin. As another variation, there may also be introduced into the bin, material which has previously passed through the apparatus of the present invention.

At the bottom of the bin 12 there is an advancing spiked belt 14. Masses of fibers are picked up by the spiked belt 14 and are advanced thereby through a limiting gate at 15, being transferred to another spiked belt 16 and carried upwardly thereby.

From the spiked belt 16 the fibers progress past a beater 18, falling into a hopper 20. Means not shown are provided for opening the hopper 20 at periodic intervals and thereby feeding batches of fibers downwardly onto a spiked belt 24. The spiked belt 24 carries the fibers into apparatus 22 which is adapted to arrange the fibers in a substantially uniform layer. It may arrange the fibers so that they lie predominantly parallel to their direction of advance. For performing this operation, and also for performing the cross-lapping operation to be described, there may be employed apparatus similar to a garnetting machine, for example, a three-cylinder twin doffer garnet.

In Figures 1 and 2, the apparatus schematically shown and designated as 22 comprises a portion of such a garnetting machine. Its two doffer rolls are indicated at 26 and 28. A layer of fibers emerges from each of these two doffer rolls, being combed therefrom by combing means not shown. These two layers of fibers are combined on an advancing belt or apron 36 as a single layer. The belt or apron 36 is of slatted or other construction including openings through which air may pass. In Figure 3 the slats of the belt 36 are illustrated as round rods, which may be linked together into a belt by chains at their ends. Alternatively, the layer of fibers may be advanced by a series of rotating rollers extending transverse to the direction of advance. In the arrangement shown in Figure 2, the belt 36 is carried by rollers 38, 40, 42 and 44. These last-mentioned rollers are carried by shafts journaled in a stationary frame 46.

At station C a stream of dry, powdered thermoplastic resin, mixed with air, is impelled into the layer of fibers on the belt 36. The layer of fibers is not illustrated at this station. The means for impelling the resin into the layer of fibers is best shown in Figure 3.

There is provided for this purpose a generally cylindrical rotor 48, serrated in cross section so as to define resin-impelling surfaces such as 49. Figures 3, 5, and 6 show respectively three different forms of the rotor. In Figure 3 the rotor is serrated by having in its surface a series of grooves parallel to the axis of the rotor, the shape of the grooves being semicircular arcs, as seen in cross section in Figure 3. In one form, the cross section of the rotor may be in the shape of a gear.

As indicated above, the rotor 48 is generally cylindrical in shape. It will be understood that the rotor and its associated inlet slot and discharge slot (to be described) extend transversely of the advancing layer to approximately the edges of the layer.

In Figure 5, a variation is shown in which the rotor 148 has a cylindrical central portion, carrying vanes 149 which extend outwardly and forwardly, that is, in the direction of rotation of the rotor. These vanes serve to impel resin and air.

In Figure 6, the rotor 248 has a cylindrical central portion, which carries rods 249 extending parallel to the axis of the rotor, the rods serving to provide impelling surfaces.

Returning to Figure 3, it may be seen that there is provided a shield 52 which embraces the rotor and fits closely around it. The shield 52 has a discharge slot 56 and an inlet slot 54, extending parallel to its axis and to the axis of the rotor. The inlet slot 54 is in the upper half of the shield and the discharge slot 56 is in its lower half. Extending upwardly from the inlet slot is a tapered chute 58, terminating at its top in an inlet opening, for feeding powdered resin to the rotor and for controlling the air currents in the region of the inlet slot. There is provided a feeder pan 60 having its outlet end above the inlet opening of the chute 58. The feeder pan 60 is carried by a vibrating table 61 supported by springs 62 and a vibrating drive 63 on a frame 64.

A stationary hopper 65, shown in Figure 2, holds powdered resin binder and has an opening at the bottom through which resin feeds into the feeder pan. This opening may be, for example, about one-half inch above the bottom of the feeder pan.

The feeder pan is continuously vibrated by the drive 63 and the table 61, so as to cause resin to be fed relatively steadily from the pan into the chute. As the resin thus moves away from the outlet opening at the bottom of the hopper, more resin moves from the hopper into the feeder pan.

Referring to Figures 2 and 3, it may be observed that the rotor rotates clockwise as viewed in these figures and that the inlet slot and inlet chute are located on the right-hand side of the rotor. The inlet chute 58 extends generally vertically, and hence gravity aids the advance of the resin particles down the inlet chute toward the rotor. Also, there is some downward movement of air in this region, because of the fact that the rotor tends to suck air in the inlet slot. The inlet chute is oriented so that in the region where it joins the shield 52, it defines an inlet path which converges, partly tangentially, with the direction of movement of the rotor. This arrangement causes an "injection" action, that is, causes air or other suitable gaseous medium and particles from the chute to be entrained and carried along by the teeth or grooves of the rotor, and causes additional air and particles to be sucked down the chute.

The impeller thus receives resin particles and air in the region of the inlet slot 54 and carries them through an arc between the inlet slot and the discharge slot, and expels or discharges them, partly by centrifugal action, through the discharge slot 56, throwing or impelling them downwardly in a direction from right to left, as seen in Figure 2, that is, in a direction which is opposed to the left-to-right direction of movement of the layer of fibers underneath the discharge slot, and which has a downward component of motion, so that the resin particles strike and pass into the layer of fibers.

It will be noticed that the discharge slot 56 is preferably displaced slightly to the right-hand at a location preceding the exact bottom of the shield, in order to aid in discharging the resin particles in a generally downward direction.

It has been found that with an impeller arrangement of the type which has been described, particularly uniform distribution of the resin throughout the layer will be obtained, and a large number of resin particles will be trapped at points where one fiber touches or crosses another, which is desired in order to bond the fibers to one another effectively after the resin is heated.

It will be understood that in the method and apparatus which has been described herein, the stream of resin particles emerging from the impeller is accompanied, to at least some extent, by a stream of air. While in Patent No. 2,671,496 there is also illustrated an arrangement in which the stream of resin particles is accompanied by a stream of air, the trajectories and the velocities of the various resin particles are different in the arrangement illustrated in the present application from those of the arrangement illustrated in Patent No. 2,671,496. In the arrangement of the present application a more uniform distribution of resin particles within the layer of fibers is obtained, regardless of whether the resin particles employed are relatively uniform or non-uniform in size.

In the arrangement of the present application, some of the resin particles may pass entirely through the layer of fibers and through the belt 36 which advances the layer. In order to recover the resin particles which pass through, there is provided underneath the belt 36 a recovery pan 66 in which such resin accumulates, and from which it may be removed, so that it may be used again in the basic resin supply of the feeder pan 60.

As shown in Figure 2, the layer of fibers, after passing the impeller is next transferred from the belt 36 to a cross-lapper or reciprocating apron comprising a belt 70 carried by rollers 72 and 74. These rollers are in turn carried by a movable frame, not shown, which reciprocates in a slot 76 in the frame 46.

The layer of fibers is, because of the reciprocating motion of the movable frame, cross-lapped onto a floor apron or belt 78, as a composite, multiple-layered mass 80. The floor apron 78 advances in a horizontal direction, at right angles to the previous horizontal direction of advance of the layer. This arrangement may be readily observed in Figure 1. It is this arrangement which causes the cross-lapping of the layers onto the floor apron 78.

For the sake of clarity in the drawings, the layer of fibers is shown only at the point where it is cross-lapped onto the floor apron 78 in Figure 2, being omitted at other points since it is believed that its inclusion would tend to be confusing.

Figure 4 may now be considered, in connection with Figure 1. The multiple-layered mass with the resin distributed therethrough is advanced by the floor apron 78 and then passed through apparatus at stations E and F to exit at G. Apparatus at stations E and F is shown diagrammatically in the drawings, and it will be understood that a variety of operations may be effected at these stations. For example, the multiple-layered mass may be compacted somewhat and trimmed at station E. The thermo-responsive resin may be activated with the aid of heat at station F, and compacting and cooling of the layer may be also effected at station F. To this end, suitable inlet and outlet ducts 134 and 136 are provided as required for leading in and out air or other suitable heating and cooling media. A method and suitable apparatus for carrying out these operations is described in detail in Patent No. 2,671,496. It is also contemplated that other means for heating the material may be provided, as, for example, hot calendering rolls, over or between which the material may be passed.

At station F the powdered resin binder is quickly heated to a temperature at which it is soft and tacky. In a typical case, using a copolymer of vinyl acetate and vinyl chloride, the resin may be heated to approximately 350° F. A more general typical range of temperature to which the resin may be heated is from 300° F. to 425° F., but the proper temperature will depend upon the resin used. However, the temperature should be high enough to activate the powdered binder but not high enough to decompose it or the fibers.

Returning to Figure 3, it may be mentioned, by way of illustration, that the impeller may be approximately six inches in diameter and may rotate at a speed of 1,000 revolutions per minute.

From the present description it will be understood that the surface of the impeller is serrated, grooved, splined, ridged, uneven or otherwise rough. Its unevenness may be caused by projections or depressions of various types. The projections may, for example, take the form of paddles, vanes, rods, ridges, or teeth, and the depressions may take the form of valleys, grooves, pockets, or the like. While the grooves, vanes, or ridges may run generally parallel to the axis of the impeller, in some variations they may run spirally of the surface of the impeller. There may also be teeth which are distributed in a more irregular manner and which do not run the entire length of the impeller.

It will be understood that the trajectory of a given resin particle discharged from the impeller is affected not only by the impelling surface which contacts or closely follows the resin particle in question, but also by the action of other impelling surfaces which create the air stream, which in turn affects the trajectory of the resin particle. The overall result is that the distribution of the resin particles in the layer of fibers is considerably more uniform and effective than with other arrangements.

As an illustration of the size of the dry, powdered resin particles which may be used with the impeller arrangement described herein, it may be stated particles of a copolymer of vinyl acetate and vinyl chloride having the approximate size distribution given below have been used satisfactorily, in connection with various fibers, including cotton fibers.

| Percent of Particles | Screen size through which they will pass (openings to the inch) |
| --- | --- |
| 5 | 400 |
| 10 | 300 |
| 60 | 200 |
| 95 | 100 |
| 100 | 50 |

It will be understood that these figures are purely illustrative. Moreover, it may prove desirable to employ particles of more nearly uniform size than in this illustration.

In one form of the invention, the resin particles should be sufficiently small that, when they are in the dry, powdered form, and before fusing, they may be adsorbed to the individual fibers when impelled into the fiber mass.

The resin should soften or melt at a temperature below the charring point of the fibers used and at a temperature higher than that at which the finished product will be used. A suitable copolymer of vinyl acetate and vinyl chloride is one having an average molecular weight of approximately 6000, formed from about 86% polyvinyl chloride and 14% polyvinyl acetate, by weight. Such a substance is sold by the Bakelite Corporation under the trade name "VYHH." As a variation, one may satisfactorily use a copolymer of vinyl acetate and vinyl chloride formed from about 86% polyvinyl chloride, 13% polyvinyl acetate, and 1% interpolymeric dibasic acid (0.7 to 0.8 carboxyl), by weight, and having a molecular weight of about 6000. Such a substance is sold by the Bakelite Corporation under the trade name "VMCH."

It will be understood that in addition to a fluffy type of product, it is possible, by the present invention, to produce products which are considerably more dense or compact. One way of controlling the compactness of of the resulting product is by varying the extent to which the product is compressed at station F.

Certain advantages may be had by utilizing two impellers, each of which may be constructed substantially as previously described. The impellers may be arranged with a first rotor 348 being rotated counterclockwise and a second rotor 349 being rotated clockwise, as viewed in Figure 7, and with the work advancing from left to right. In that arrangement, the inlet chute 350 is mounted above and to the left of the axis of rotor 348 and the inlet chute 351 is mounted above and to the right of the axis of rotor 349. Thus, the first or left-hand rotor 348 discharges resin downwardly and somewhat to the right, while the second or right-hand rotor 349 discharges resin downwardly and somewhat to the left. Preferably, the rotors are spaced far enough apart so that a given portion of the layer receives resin from the two rotors in succession rather than simultaneously.

In the arrangement illustrated in Figure 7, the discharge streams converge toward one another but their paths preferably do not intersect. In another arrangement, by interchanging the two impellers and their associated inlet chutes, so that the clockwise-rotating impeller is on the left and the counterclockwise-rotating impeller is on the right, the discharge streams may be made to diverge.

It is usually desired to produce as uniform a distribution of the powdered resin throughout the layer as is possible. In some cases, however, it may be advantageous to produce a finished batting product in which there is more resin toward one of the surfaces than toward the other. In one arrangement for accomplishing this, more resin may be applied by the impeller toward one edge of the advancing layer than toward the other. For example, in the arrangement illustrated in Figures 1 and 2, let it be assumed that more resin is applied toward the left-hand edge of the advancing layer (as viewed when facing in the direction of advance of said layer), than toward the right. The result will be, because of the cross-lapping and shingling effect, that in the finished batting there will be more resin toward the bottom surface of the batting than toward the top. This may be accomplished by suitably arranging the resin feeding apparatus or the impeller proper. For example, the lower end of the chute 58 may be larger toward the left-hand end of the layer than toward the right-hand end. Alternatively, the impeller 48 may be formed so that at least some of its resin impelling surfaces are set on an angle so as to direct some of the resin binder in a direction having a component toward the left-hand edge of the advancing layer. In this manner more resin may be applied toward one edge of the advancing layer than toward the other, in order to control the distribution of the powdered resin in accordance with a prescribed pattern, and in particular in order to apply more resin toward one surface of the finished batting than toward the other.

As another variation of the construction of the impeller, useful in certain special cases, instead of forming its rotor in a generally cylindrical shape, it may be tapered, so that it is generally in the shape of a truncated cone. Such a shape may be employed to advantage if it is desired to apply more resin toward one edge of the layer than toward the other. For example, if a large number of small teeth are placed approximately uniformly over the surface of the rotor, the large end of the rotor will have more teeth around its circumference than will the small end, and consequently may be made to apply more resin than does the small end.

As another variation of the method and apparatus of the present invention, after the powdered resin has been applied to the layer of fibers, and before the cross-lapping step, the layer may be corrugated. The corrugated layer is thereafter cross-lapped, compacted, re-heated, and cooled, thereby forming batting. The corrugating procedure has been found to improve the resiliency and tensile strength of the resulting batting. Figures 8 and 9 show two different arrangements for corrugating the layer.

As shown in Figure 8, there may be provided a conveyer belt 200 carried by guide rollers 202 and 204. The conveyer 200 may comprise spaced-apart transverse rods 206 carried at their ends by chains. In explaining the relationship of the apparatus of Figure 8 to that of Figures 1 and 2, it may be pointed out that, in case the corrugating arrangement of Figure 8 is to be employed, it will be substituted for that portion of the apparatus in Figure 2 which is designated by reference characters 36 through 42, along with the associated impeller and resin feeder. The output end of the garnetting apparatus 22 of Figure 2 is repeated in Figure 8. The web 80, emerging from the garnetting apparatus 22, is advanced by the conveyer 200 underneath a resin impeller 208, where powdered resin is applied. The resin-impregnated layer of fibers is then advanced past a row of heaters 210, for example, of the electric type, and, after leaving the conveyer 200, passes between mating corrugating rollers 212 and 214. Both rollers 212 and 214 are preferably heated, as, for example, by the application of heat to their interior. The corrugated web passes around one of the rollers 214 through an extended arc, thence downwardly to cross-lapping apparatus, such as that indicated at 72, 74 and 78 in Figure 2. It subsequently passes through the compacting, heating, and cooling apparatus at stations E and F which has been described in connection with Figure 1. The temperature of the roller 214 around which the web passes, even though it may be above room temperature, should be sufficiently low that the thermoplastic binder within the web may set at least partially while the web is still held in a corrugated shape by the surface of the roller 214. The roller 212, which does not contact the web after the embossing takes place, should be at a temperature above that at which the binder softens, and may be maintained at a higher temperature than that of the roller 214.

A variation of the corrugating apparatus is shown in Figure 9. In this arrangement, instead of using electric heaters for softening the resin, the resin-impregnated layer is passed into the path of a jet of steam emerging from a nozzle 216. The steam heats and softens the powdered resin and also moistens the fibers. In Figure 9, instead of using a pair of mating corrugating rollers, there is used a single heated roller 218, which cooperates with the conveyor 220 as shown, to corrugate the web. The conveyor 220 comprises spaced-apart transverse rods carried at their ends by chains. The conveyer therefore presents a corrugated surface. The corrugating roller 218 has an outer surface corrugated in such a manner as to fit and mate with the spaced-apart transverse rods of the conveyer 220. The layer of fibers, after being corrugated by the hot corrugating roller 218 and the corrugating conveyer, advances on and is cooled on the conveyer being thereafter removed, cross-lapped, compacted, heated and cooled, as heretofore described.

It will be understood that in Figures 8 and 9 the heat from the heaters 210 or the steam nozzle 216 softens the powdered resin, which consequently tends to bond the fibers in the corrugated arrangement and, since the layer is cooled in this arrangement, it tends to retain this arrangement to some extent through the subsequent cross-lapping step. Although the cross-lapping and compacting steps tend to flatten out the corrugations to a considerable extent, the final result is that in the finished batting the fibers are re-arranged in such a way as materially to increase the resiliency and tensile strength of the batting.

One embodiment of the corrugating method may be recapitulated as follows:

This particular embodiment of the method comprises forming a layer comprising non-thermoplastic fibers, continuously advancing the layer, impelling into the layer a powdered thermoplastic binder, heating the impregnated layer, corrugating the impregnated layer with the aid of mating corrugating means, cooling the layer at least partially while still in contact with at least part of the corrugating means, cross-lapping the corrugated layer so as to form multi-layer batting, and thereafter compacting the batting, heating it to render the resin therein soft and tacky, and cooling the batting. The batting should be under at least some compression during the time when the resin is soft and tacky and while the resin cools and sets.

While, in most cases, it is advantageous to apply the resin prior to the corrugating step for the sake of increased uniformity of distribution of the resin, it has been found that some unusual effects can be obtained if resin is applied to the layer after corrugating it. In one embodiment of this arrangement, all the resin is applied after corrugating the layer. In this arrangement the resulting corrugations will not be so pronounced as in other arrangements in which the resin is present at the time the corrugations are formed.

In another arrangement, part of the resin is first applied, the impregnated layer is corrugated with the aid of heat, cooled, additional resin is then applied to the corrugated layer, and then the cross-lapping, compacting, heating, and cooling steps are performed.

It will be understood that while the cross-lapping and subsequent heating procedure which has been described herein is quite advantageous, other arrangements of handling the impregnated layer may be used in connection with the impeller apparatus and method which have been described herein. For example, after the single layer is impregnated with powdered resin, it may be heated while still a single layer, lapped or cross-lapped while maintaining the heat in it, that is while still hot or warm, then compressed while hot or warm to the density required, and cooled while in a compressed condition. In one such embodiment, no additional heat is applied after the original heat is applied to the single layer. In other embodiments, additional heat is applied during or prior to compressing the multi-layer mass. It will be understood that one advantage of these various arrangements in which heat is applied before cross-lapping is that it is easier to heat a single layer than it is to heat a plurality of layers which have been combined. The result is that by heating this single layer and then stacking up the layers while still warm, it is easier in this manner to make certain that the inner layers of the multi-layer configuration are hot enough at the time they are compressed to become properly bonded.

As another variation, the single layer can be heated, compacted, and cooled without combining it into a multi-layer body.

While a suitable form of apparatus and method, to be used in accordance with the invention, and certain modifications, have been described, it will be understood that numerous changes may be made without departing from the general principles and scope of the invention.

We claim:

1. In an apparatus for continuously impregnating and bonding fibers together having means for advancing a layer of fibers along a predetermined path, means for impregnating said layer with powdered bonding material and including at least one rotatably mounted impeller member adjacent said path, means for rotating said impeller member, and means for feeding powdered bonding material particles to said impeller member, said impeller member receiving said particles and impelling the same into the advancing layer of fibers.

2. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising at least one elongated rotatably mounted impeller member extending transversely of and adjacent to said path in advance of said activating means, means for rotating said impeller member, and means for feeding powdered resin particles to said impeller member, said impeller member receiving and striking said resin particles and directing the same into the advancing layer of fibers.

3. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin entrained in a gaseous stream comprising at least one elongated rotatably mounted impeller member extending transversely of and adjacent to said path in advance of said activating means, means for rotating said impeller member, shield means closely surrounding said impeller member and having an inlet and discharge opening, and means for feeding said powdered resin through said inlet to said impeller member, said impeller member drawing said resin together with a gaseous stream from said inlet and directing the same through said discharge opening into the advancing layer of fibers.

4. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising at least one elongated rotatably mounted rotor having a serrated surface and extending transversely of and adjacent to said path in advance of said activating means, means for rotating said rotor, and means for feeding said powdered resin to said rotor, said rotor receiving said resin in said serrations and directing the same into the advancing layer of fibers.

5. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising at least one elongated rotatably mounted rotor having a serrated surface and extending transversely of and adjacent to said path in advance of said activating means, shield means closely encircling said rotor and having an inlet and a discharge opening, said discharge opening being offset upstream from the plane extending through the axis of said rotor and normal to said path, and means for feeding said powdered resin through said inlet opening to said rotor, said rotor receiving said resin in said serrations and directing the same into the advancing layer of fibers.

6. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising a generally cylindrical rotor having a serrated surface defining resin impelling surfaces, said rotor being rotatably mounted and extending transversely of and adjacent to said path in advance of said activating means, a tubular shield closely encircling said rotor and having elongated inlet and discharge slots formed therein and extending substantially parallel with the axis of said rotor, said inlet slot being disposed on one side of the axis of the rotor and the discharge slot being disposed on the other, an inlet chute communicating with said inlet slot and having an inlet opening exposed to an atmosphere, means for feeding powdered resin to said inlet opening, and means for rotating said rotor, said rotor serving to draw both resin particles and a stream of said atmosphere through said chute and inlet slot and discharging said stream and resin through said discharge slot into said layer of fibers.

7. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin particles comprising a generally cylindrical toothed rotor extending transversely of and adjacent to said path in advance of said activating means, shield means closely encircling said rotor and having an inlet and a discharge opening, and means for feeding said powdered resin particles through said inlet opening to said rotor, said rotor receiving and striking said resin particles with said teeth and directing the same into the advancing layer of fibers.

8. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising a generally cylindrical rotor having a serrated surface defining resin impelling surfaces, said rotor being rotatably mounted and extending horizontally transversely of and adjacent to said path in advance of said activating means, a tubular shield closely encircling said rotor and having elongated inlet and discharge slots formed therein and extending substantially parallel with the axis of said rotor, said discharge slot being disposed offset upstream from the plane extending through the axis of said rotor and normal to said path, an inlet chute communicating with said inlet slot and having an inlet opening exposed to an atmosphere, means for feeding powdered resin to said inlet opening, and means for rotating said rotor, said rotor serving to draw both resin particles and a stream of said atmosphere through said chute and inlet slot and discharging said stream and resin through said discharge slot into said layer of fibers.

9. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising at least two elongated rotatably mounted impeller members each extending transversely of and on one side of said path in advance of said activating means, means for rotating said impeller members, and means for feeding said powdered resin to said impeller members, said impeller members receiving said resin and directing the same into the advancing layer of fibers.

10. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising at least two substantially cylindrical rotatably mounted rotors each extending transversely of and on one side of said path in side by side relation and in advance of said activating means, means for rotating said rotors in opposite directions, and means for feeding said powdered resin to said rotors, said rotors each receiving said resin and directing the same into the advancing layer of fibers.

11. In an apparatus for continuously impregnating fibers with thermo-responsive powdered resin and bonding the same having means for advancing a layer of said fibers along a given path with means for activating said resin and bonding said fibers disposed along said path, means for impregnating said layer of fibers with powdered thermo-responsive resin comprising at least two generally cylindrical rotors each having serrated surfaces defining resin impelling surfaces, said rotors being rotatably mounted in substantially horizontal parallel side by side relation and extending transversely of and on one side of said path in advance of said activating means, at least two tubular shields one closely encircling each of said rotors and each having elongated inlet and discharge slots formed therein and extending substantially parallel with the axes of said rotors, the discharge slots being disposed offset upstream from the plane extending through the axes of the rotor associated therewith and normal to said path, inlet chute means communicating with each of said inlet slots and having an inlet opening exposed to an atmosphere, means for feeding powdered resin to said inlet opening, means for rotating said rotors in opposite directions, said rotors each serving to draw both resin particles and a stream of said atmosphere through said chute means and inlet slots and discharging said stream and resin through said discharge slots into said advancing layer of fibers.

12. In an apparatus for bonding fibers together, in combination, a conveyer advancing continuously along a path, means for applying a layer comprising fibers onto said conveyer, means for impregnating said advancing layer of fibers with powdered thermoplastic resin, means for heating said resin-impregnated layer, corrugating means including a roller having a corrugated surface for corrugating the heated, resin-impregnated layer, cross-lapping means for lapping said corrugated layer to build up a thicker layer, and means for compacting, heating, and cooling said thicker layer, to bond said fibers together.

13. In an apparatus for bonding fibers together, in combination, a conveyer continuously advancing along a path, means for applying a layer comprising fibers onto said conveyer, impregnating means comprising a rotating rotor for impelling powdered thermo-responsive resin into said advancing layer of fibers, corrugating means located at a point in said path subsequent to said impregnating means, means advancing said layer of fibers past said corrugating means, means for heating said resin in said advancing layer at a point at least as early in said path as the location of said corrugating means, said corrugating means serving to corrugate said layer with the aid of said heated resin, lapping means located at a point subsequent to said corrugating means for lapping said corrugated layer to build up a thicker layer, and means for compacting, heating, and cooling said thicker layer to bond the same, thereby forming batting.

14. In a method of impregnating fibers with thermo-responsive powdered resin and bonding the fibers by activating the resin in which the fibers are advanced as a layer in a given direction substantially horizontally over at least a portion of a predetermined path, mixing powdered thermo-responsive resin with air and impelling a first stream of the resulting mixture into said layer from above said layer in a downward direction having a component directed in said given direction, and impelling a second stream of a similar mixture into said layer from above the layer in a downward direction having a component in the direction opposite to said given direction.

15. In a method of bonding fibers together, the steps of advancing said fibers along a predetermined path, impelling powdered thermo-responsive resin into said layer of fibers, heating said layer, together with the resin therein, corrugating the thus said impregnated and heated layer, cooling said corrugated layer, and lapping, reheating, compacting, and cooling the same so as to form batting.

References Cited in the file of this patent

UNITED STATES PATENTS

| | | |
|---|---|---|
| 1,047,695 | Penfield | Dec. 17, 1912 |
| 1,737,283 | Weiss | Nov. 26, 1929 |
| 2,228,877 | Howell | Jan. 14, 1941 |
| 2,288,072 | Collins | June 30, 1942 |
| 2,671,496 | Chavannes et al. | Mar. 9, 1954 |
| 2,681,637 | Simpson | June 22, 1954 |
| 2,702,261 | Bacon et al. | Feb. 15, 1955 |

FOREIGN PATENTS

| | | |
|---|---|---|
| 562,308 | Great Britain | June 27, 1944 |
| 668,217 | Great Britain | Mar. 12, 1952 |